United States Patent
Kim et al.

(10) Patent No.: US 10,298,105 B2
(45) Date of Patent: May 21, 2019

(54) LINEAR VIBRATOR

(71) Applicant: EM-TECH. Co., Ltd., Busan (KR)

(72) Inventors: Jong Dae Kim, Gyeonggi-do (KR); Keun Yong Hwang, Incheon (KR)

(73) Assignee: EM-TECH, Co., Ltd., Busan (KR)

( * ) Notice: Subject to any disclaimer, the term of this patent is extended or adjusted under 35 U.S.C. 154(b) by 120 days.

(21) Appl. No.: 15/478,653

(22) Filed: Apr. 4, 2017

(65) Prior Publication Data
US 2017/0288519 A1 Oct. 5, 2017

(30) Foreign Application Priority Data
Apr. 5, 2016 (KR) .......................... 10-2016-0041514

(51) Int. Cl.
*H02K 33/00* (2006.01)
*H02K 33/16* (2006.01)

(52) U.S. Cl.
CPC ............. *H02K 33/00* (2013.01); *H02K 33/16* (2013.01)

(58) Field of Classification Search
CPC ........ H02K 33/00; H02K 33/02; H02K 33/16; H02K 7/065
USPC ............................................................ 310/25
See application file for complete search history.

(56) References Cited

U.S. PATENT DOCUMENTS

| | | | | |
|---|---|---|---|---|
| 7,952,258 B2 * | 5/2011 | Mori | .................... | H02N 2/0015 310/323.01 |
| 8,097,988 B2 * | 1/2012 | Kim | ....................... | H02K 33/16 310/15 |
| 8,138,639 B2 * | 3/2012 | Choi | ....................... | H02K 33/06 310/15 |
| 8,258,657 B2 * | 9/2012 | Kim | ....................... | H02K 15/02 310/28 |

FOREIGN PATENT DOCUMENTS

| KR | 101064469 B1 * | 9/2011 | ............. B06B 1/045 |
|---|---|---|---|
| KR | 20120092248 A | 8/2012 | |
| KR | 101434554 B1 | 8/2014 | |
| KR | 101484858 B1 * | 1/2015 | |

* cited by examiner

*Primary Examiner* — Alex W Mok
(74) *Attorney, Agent, or Firm* — Murphy, Bilak & Homiller, PLLC (57) ABSTRACT

A linear vibrator includes a bracket having a plate shape, a casing having a hexahedral shape with an open bottom and coupled to the bracket, a circuit board on the bracket, a coil on the circuit board, a pair of magnets spaced apart from each other and disposed over the coil at an interval from the coil, a plate having a pair of magnet attachment surfaces attached to top surfaces of the pair of magnets and a connection surface downwardly bent with a step difference from the magnet attachment surfaces and connecting the pair of magnet attachment surfaces, a weight on top of the plate, and a spring on top of the connection surface and formed in a strip shape with two ends secured to the casing and a center portion secured to the connection surface. The spring is bilateral symmetric and has at least a pair of inwardly-bent portions.

9 Claims, 7 Drawing Sheets

LINEAR VIBRATOR

PRIORITY CLAIM

The present application claims priority to Korean Patent Application No. 10-2016-0041514 filed on 5 Apr. 2016, the content of said application incorporated herein by reference in its entirety.

TECHNICAL FIELD

The present invention relates to a linear vibrator, and more particularly, to a linear vibrator with an improved spring structure.

BACKGROUND

A vibration motor has been used as a vibration generation means, which is one of the most significant features of an electronic device such as a mobile phone, the motor with an eccentric axis or an unbalanced center of gravity being rotated to generate vibration. However, the vibration motor has many problems that a brush passes through interpolar regions between segments during the rotation of the motor, causing friction and sparks, which leads to a shorter lifespan.

A linear vibrator has been developed to solve the aforementioned problems of the vibration motor. The linear vibrator suffers from less friction and abrasion than the vibration motor because a vibrator mounted on a spring vibrates in an up-down or left-right linear motion due to an electromagnetic force between magnets and a coil. In addition, the linear vibrator can be produced in a smaller size, so developed in various forms.

Figure 1:
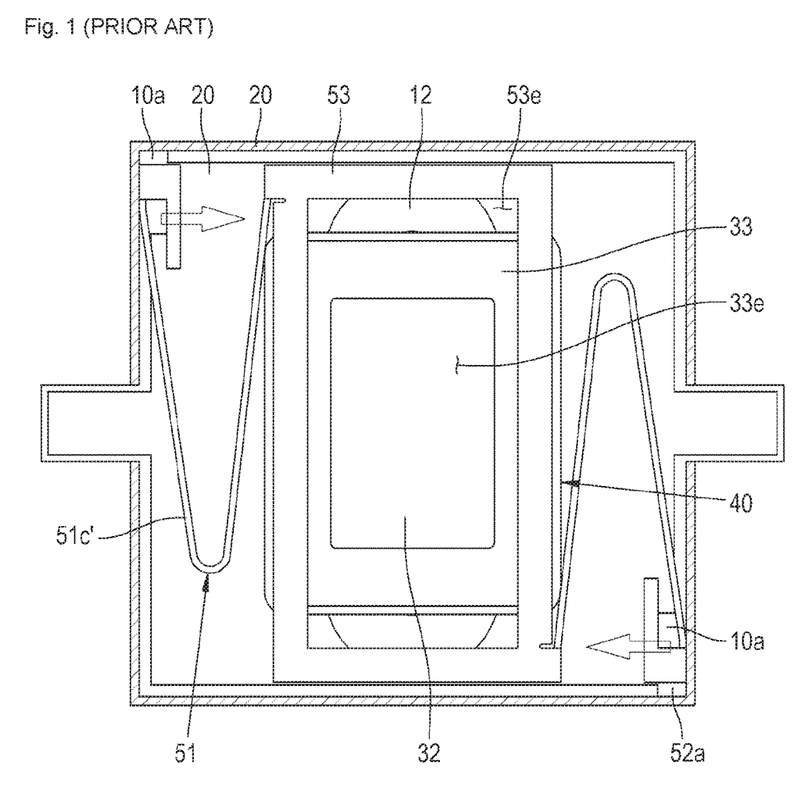
FIG. 1 is a view showing an example of a conventional linear vibrator.

FIG. 1 is a view showing an example of a conventional linear vibrator. As disclosed in Korea Registered Patent Publication No. 10-1434554, a horizontal linear vibrator includes a bracket 10, a casing 20, a coil 12, a vibration body 30, a housing 40, and an elastic member 51. The elastic member 51 of the conventional linear vibrator shown in FIG. 1 includes a rectangular horizontal plate 53 having a certain volume, a pair of plate springs 51c' formed in a V shape, integrally bent at both side front and rear ends of the horizontal plate 53 in opposite directions, respectively, with a sectional shape of '∧' and '∨', and elastically deformed in the horizontal direction in the form of a cantilever, respectively, and a pair of horizontal welding fixing plates 52a integrally bent on the respective end top and bottom surfaces of the plate springs 51c' toward the horizontal plate 53 to secure the upper and lower ends of the plate springs 51c' to the ceiling surface of the casing 200 and the top surface of the bracket 10 by the welding, respectively.

However, in the conventional linear vibrator, the plate springs 51c' of the elastic member 51 disposed at both sides of the vibration body 30 located at the center are provided in the diagonal direction, so the restoring forces of the plate springs 51c' of the elastic member 51 are not applied to the center of the vibration body 30 but to the edges of the vibration body 30, as indicated by the red arrows of FIG. 1. Accordingly, some minute rotational force may occur on the vibration body 30, causing undesired irregular motion, as a result of which the bracket 10 and the vibration body 30 may interfere with each other and disadvantageously reduce vibration performance or stability.

SUMMARY

An object of the present invention is to provide a linear vibrator which can prevent rotation or abnormal behavior of a vibration body by causing loads to be applied through a center of a symmetric spring.

In addition, another object of the present invention is to provide a linear vibrator which can improve operability and reduce the unit cost of production by employing only a single spring for supporting a vibration body.

Furthermore, a further object of the present invention is to provide a linear vibrator which can have an increased vibration amount by biasing an amplitude center.

According to an aspect of the present invention for achieving the above objects, there is provided a linear vibrator including a bracket which is formed in a plate shape, a casing formed in a hexahedral shape with an open bottom and coupled to the bracket, a circuit board disposed on the bracket, a coil disposed on the circuit board, a pair of magnets spaced apart from each other and disposed over the coil at a certain interval from the coil, a plate having a pair of magnet attachment surfaces attached to the top surfaces of the pair of magnets and a connection surface downwardly bent with a step difference from the magnet attachment surfaces and connecting the pair of magnet attachment surfaces, a weight disposed on top of the plate, and a spring disposed on top of the connection surface and formed in a strip shape with two ends secured to the casing and a center portion secured to the connection surface, wherein the spring is bilateral symmetric and has at least a pair of inwardly-bent portions.

In some embodiments, a small-width portion having a smaller width than the other portions is provided at the center portion of the spring.

In some embodiments, the spring has holes in bilateral symmetric positions.

In some embodiments, the center portion of the spring has a hole, and the connection surface of the plate has a protrusion to be fitted into the hole, the spring and the plate being secured to each other by the welding with the protrusion of the plate fitted into the hole of the center portion of the spring.

In some embodiments, the casing has slits at both sides so that the two ends of the spring can be drawn out through the slits.

In some embodiments, the two ends of the spring have holes, and the casing has protrusions in its portions contacting the two ends of the spring drawn out, the spring and the casing being secured to each other by the welding with the protrusions of the casing fitted into the holes of the two ends of the spring.

In some embodiments, the two ends of the spring are elastically deformed to pressurize the contacting surfaces of the casing, and then secured to the casing by the welding.

In some embodiments, both ends of the weight downwardly extend to cover the side surfaces of the plate and magnets.

In some embodiments, during the vibration of the magnets, plate and weight an amplitude center is biased with respect to a geographical center of the linear vibrator.

The linear vibrator according to the present invention can improve operability during the assembly and reduce the unit cost of production by employing only a single spring and can increase the vibration amount by biasing the vibration amplitude center with respect to the geographical center by changing the installation position of the spring.

Those skilled in the art will recognize additional features and advantages upon reading the following detailed description, and upon viewing the accompanying drawings.

DETAILED DESCRIPTION

Hereinafter, a preferred embodiment of a linear vibrator according to the present invention will be described in detail with reference to the accompanying drawings.

Figure 2:
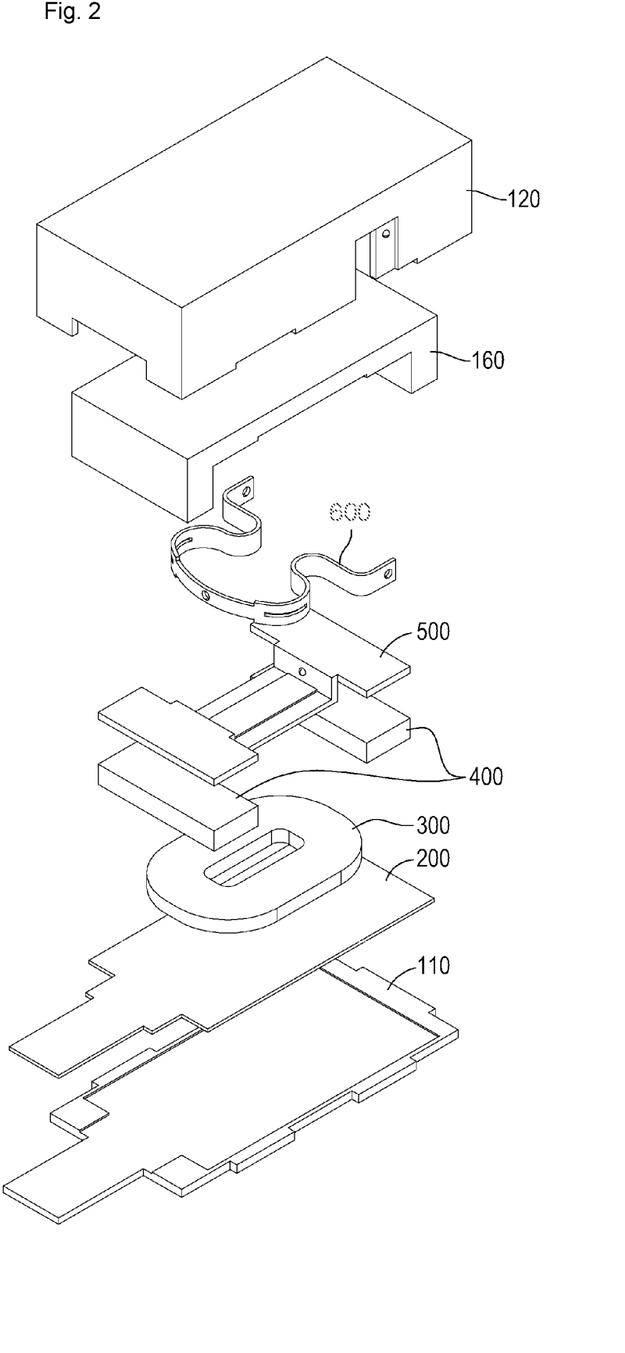
FIG. 2 is an exploded perspective view showing a linear vibrator according to an embodiment of the present invention.
Figure 3:
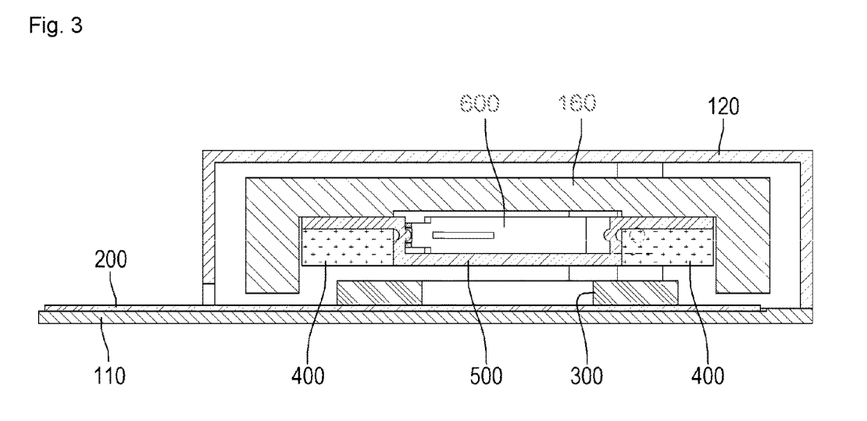
FIG. 3 is a sectional view showing the linear vibrator according to the embodiment of the present invention.

FIG. 2 is an exploded perspective view showing a linear vibrator according to an embodiment of the present invention, and FIG. 3 is a sectional view showing the linear vibrator according to the embodiment of the present invention. The linear vibrator according to the embodiment of the present invention includes a bracket 110 which is formed in a plate shape and a casing 120 formed in a hexahedral shape with an open bottom and coupled to the bracket 110. The bracket 110 and the casing 120 are coupled to each other to define a hexahedral space which accommodates vibration generation components of the linear vibrator. First, a circuit board 200 transferring electric signals is disposed on the bracket 110, and a coil 300 electrically connected to the circuit board 200 and receiving electric signals is disposed on the circuit board 200. A pair of magnets 400, which are spaced apart from each other, are disposed over the coil 300 at a certain interval from the coil 300. The pair of magnets 400 vibrate in a horizontal direction due to a mutual electromagnetic force, when an electric signal is sent to the coil 300.

Meanwhile, the pair of magnets 400 are attached to a plate 500 so that they can move at the same time. The plate 500 has a pair of magnet attachment surfaces (not shown) attached to the top surfaces of the magnets 400 and a connection surface (not shown) downwardly bent with a step difference from the magnet attachment surfaces (not shown) and connecting the pair of magnet attachment surfaces (not shown). In addition, a weight 160 increasing the intensity of the vibration is attached to the top surface of the plate 500, the weight 160 being in contact with the magnet attachment surfaces (not shown) but not in contact with the connection surface (not shown), as a result of which a space for a spring 600 is defined on the connection surface (not shown).

The spring 600 is disposed on top of the connection surface and formed in a strip shape with two ends secured to the casing 120 and a center portion secured to the connection surface (not shown). Here, the spring 600 is bilateral symmetric and has at least a pair of inwardly-bent portions (not shown).

Figure 4:
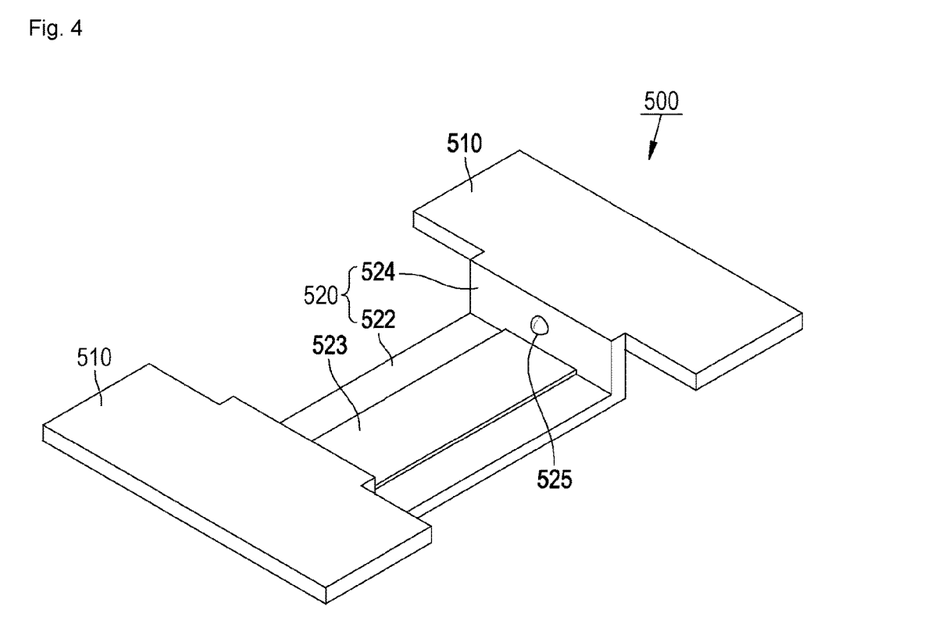
FIG. 4 is a view showing a plate provided in the linear vibrator according to the embodiment of the present invention.

FIG. 4 is a view showing the plate provided in the linear vibrator according to the embodiment of the present invention. As described above, the plate 500 is composed of a pair of magnet attachment surfaces 510 attached to the top surfaces of the magnets 400 (see FIGS. 2 and 3) and a connection surface 520 connecting the magnet attachment surfaces 510. The connection surface 520 has a step difference from the magnet attachment surfaces 510 and is located in a lower position than the magnet attachment surfaces 510. Therefore, the connection surface 520 includes a pair of vertical surfaces 524, which are in contact with the inner surfaces of the magnets 400 (see FIGS. 2 and 3), and a horizontal surface 522 connecting the vertical surfaces 524. Part of the spring 600 is disposed on the horizontal surface 522 of the connection surface 520. The center portion of the spring 600 is secured to the connection surface 520 by the welding, and the connection surface 520 is provided with a structure for improving efficiency of the welding. The spring 600 is welded to the vertical surfaces 524 of the connection surface 520 that have protrusions 525, the welding being performed after the protrusion 525 is fitted into a hole of the spring 600 discussed later. In the meantime, in the horizontal surface 522 of the connection surface 520, a center portion 523 is disposed in a higher position than the edges so as to support a small-width portion of the spring 600 discussed later.

Figure 5:
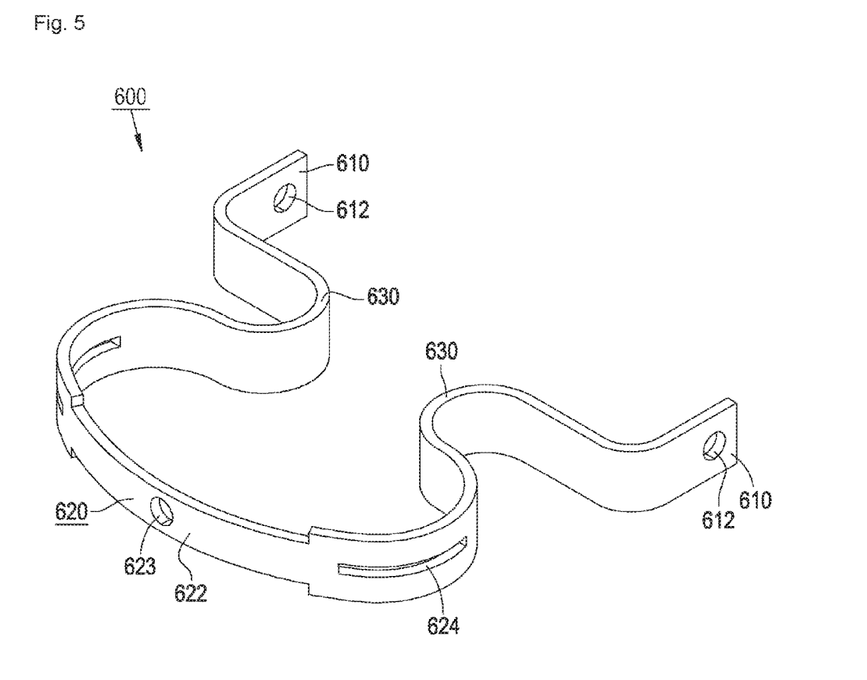
FIG. 5 is a view showing a spring provided in the linear vibrator according to the embodiment of the present invention.

FIG. 5 is a view showing the spring provided in the linear vibrator according to the embodiment of the present invention. As described above, two ends 610 of the spring 600 are secured to the casing 120 (see FIGS. 2 and 3), and the center portion 620 thereof is secured to the connection surface 520 (see FIG. 4) of the plate 500 (see FIG. 4). The bilateral symmetric bent portions 630 are provided between the center portion 620 and the two ends 610. Accordingly, when the magnets 400 (see FIGS. 2 and 3) vibrate in a horizontal direction, a force is applied to the spring 600 through the center portion 620 contacting the connection surface 520. The bilateral symmetric bent portions 630 are elastically deformed and restored, which assists the vibration body (magnets, plate and weight) of the linear vibrator to vibrate. Here, the force-applied position of the spring 600 is consistent with the symmetric center of the spring 600, so there is a less possibility of the occurrence of lateral vibration or abnormal vibration on the vibration body.

On the other hand, a small-width portion 622 having a smaller width than the other portions is provided at the center portion 620 of the spring 600. Advantageously, the small-width portion 622 serves to reduce the elastic modulus of the spring 600 so as to increase the amplitude of the vibration body. Here, since the bent portions 630 are often deformed, if they have a small-width portion, it is probably subject to a fatigue failure, and since the two ends 610 are not at all deformed, even if they have a small-width portion, it is not relevant to the elastic modulus.

In addition, elongated holes 624 are provided between the small-width portion 622 and the bent portions 630 in the longitudinal direction of the spring 600. The holes 624 also serve to reduce the elastic modulus of the spring 600 so as to increase the amplitude of the vibration body. The holes 624 are also symmetrically formed in bilateral symmetric positions. It will be appreciated that a plurality of holes may be provided, although the two elongated holes 624 are provided at the left and right sides, respectively, in the embodiment of the present invention.

Further, a hole 623 is provided in the center portion of the spring 600. As described above, the welding is performed with the protrusion 525 of the connection surface 520 of the plate 500 fitted into the hole 623, which results in high welding efficiency.

Furthermore, holes 612 are provided in the two ends 610 of the spring 600, and the welding is performed after protrusions of the casing 120 discussed later are fitted into the holes 612.

Figure 6:
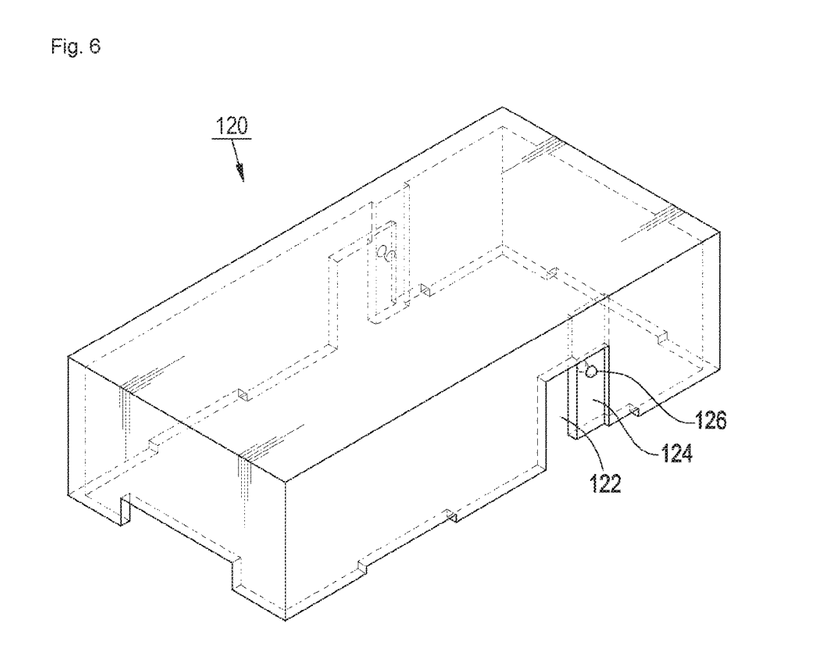
FIG. 6 is a view showing a casing provided in the linear vibrator according to the embodiment of the present invention.

FIG. 6 is a view showing the casing provided in the linear vibrator according to the embodiment of the present invention. The casing 120 has slits 122 at both sides so that the two ends 610 of the spring 600 can be drawn out through the slits 122. The two ends 610 of the spring 600 are drawn out through the slits 122 and supported on spring support surfaces 124. The spring support surfaces 124 preferably have a step difference from the outer surface of the casing 120, which prevents the two ends 610 of the spring 600 disposed on the spring support surfaces 124 from projecting more than the outer surface of the casing 120.

As described above, the protrusions 126 for the welding are provided on the spring support surfaces 124, and the welding of the spring 600 and the casing 120 is performed with the protrusions 126 fitted into the holes 612 of the two ends 610 of the spring 600.

Meanwhile, before the assembly of the spring 600, the distance between the two ends 610 of the spring 600 is smaller than the distance between the spring support surfaces 124 of the casing 120. That is, when the spring 600 is coupled to the spring support surfaces 124 of the casing 120, the spring 600 pressurizes the spring support surfaces 124 to be firmly secured thereto.

Referring back to FIG. 3, both ends of the weight 160 downwardly extend to cover the outer surfaces of the plate and magnets. As a result, there is an advantage of concentrating the weight 160 on both ends and increasing the vibration amount.

Meanwhile, the linear vibrator according to the present invention is characterized in that an amplitude center during the vibration of the magnets, plate and weight, i.e., the vibration body is biased with respect to a geographical center of the linear vibrator. The amplitude center is biased to the side on which the center portion of the spring 600 is located, as a result of which the vibration amount increases.

Figure 7:
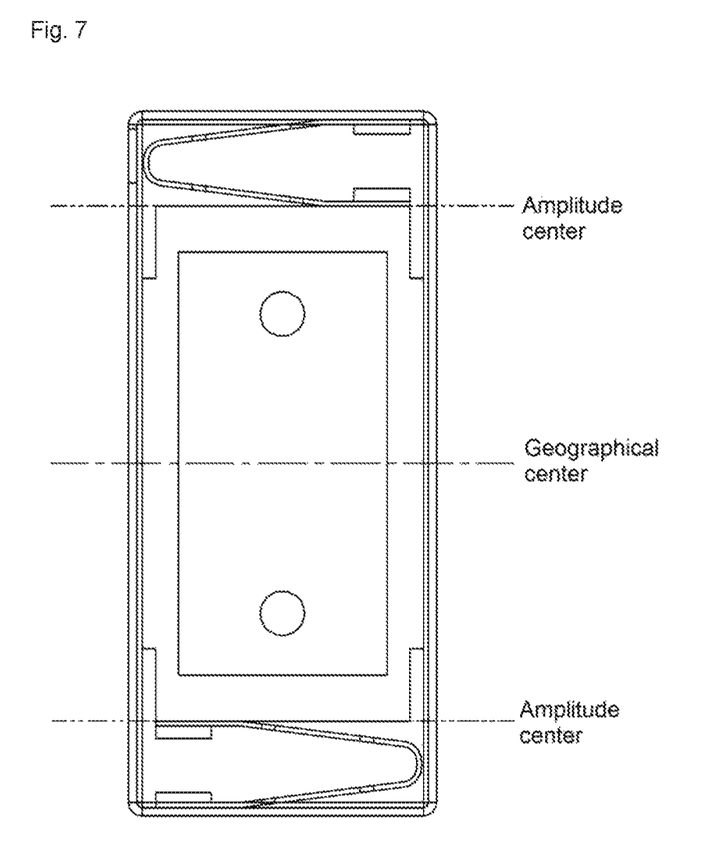
FIG. 7 is a view showing a geographical center and amplitude centers of the conventional linear vibrator.
Figure 8:
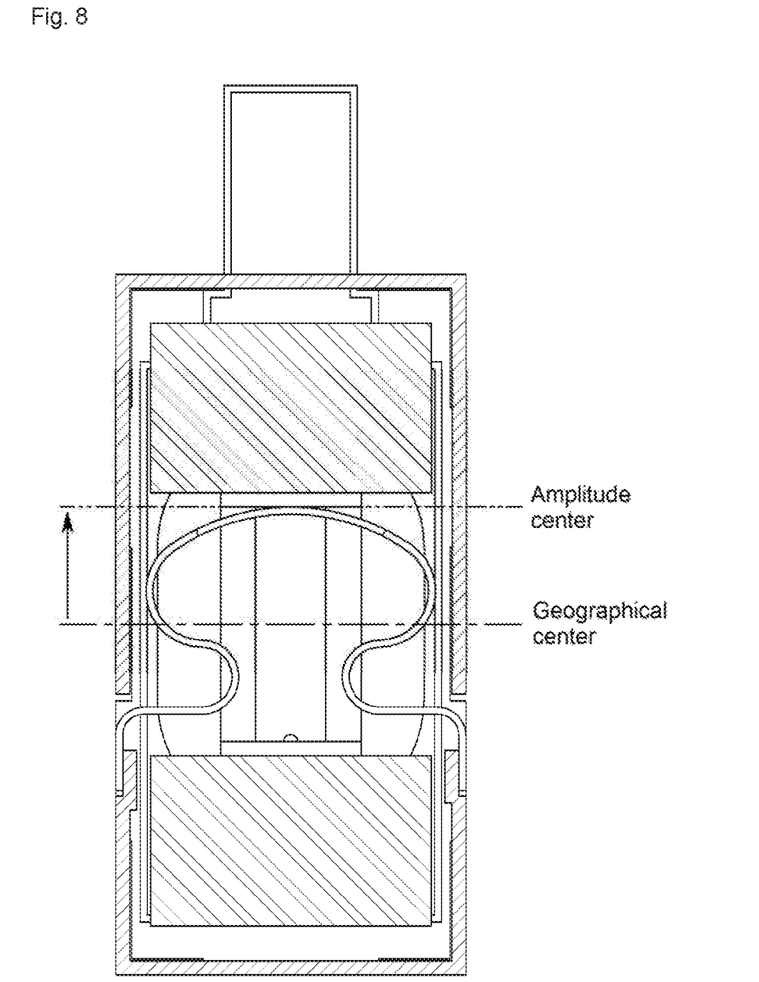
FIG. 8 is a view showing a geographical center and an amplitude center of the linear vibrator according to the embodiment of the present invention.

FIG. 7 is a view showing a geographical center and amplitude centers of the conventional linear vibrator, and FIG. 8 is a view showing a geographical center and an amplitude center of the linear vibrator according to the embodiment of the present invention. The conventional linear vibrator has two springs in two different positions, so has two symmetric amplitude centers, and the final amplitude center is identical to the geographical center. On the contrary, the linear vibrator according to the embodiment of the present invention can advantageously increase the vibration amount by biasing the amplitude center with respect to the geographical center. Moreover, the linear vibrator according to the embodiment of the present invention advantageously can improve operability during the assembly of the product and reduce the unit cost of production by employing only a single spring.

As used herein, the terms "having", "containing", "including", "comprising" and the like are open-ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A linear vibrator, comprising:
a bracket formed in a plate shape;
a casing formed in a hexahedral shape with an open bottom and coupled to the bracket;
a circuit board disposed on the bracket;
a coil disposed on the circuit board;
a pair of magnets spaced apart from each other and disposed over the coil at an interval from the coil;
a plate having a pair of magnet attachment surfaces attached to top surfaces of the pair of magnets and a connection surface downwardly bent with a step difference from the magnet attachment surfaces and connecting the pair of magnet attachment surfaces;
a weight disposed on top of the plate; and
a spring disposed on top of the connection surface and formed in a strip shape with two ends secured to the casing and a center portion secured to the connection surface,
wherein the spring is bilateral symmetric and has at least a pair of inwardly-bent portions.

2. The linear vibrator of claim 1, wherein a small-width portion having a smaller width than the other portions is formed at the center portion of the spring.

3. The linear vibrator of claim 1, wherein the spring has holes in bilateral symmetric positions.

4. The linear vibrator of claim 1, wherein the center portion of the spring has a hole, wherein the connection surface of the plate has a protrusion to be fitted into the hole, and wherein the spring and the plate are secured to each other by a welding with the protrusion of the plate fitted into the hole of the center portion of the spring.

5. The linear vibrator of claim 1, wherein the casing has slits at both sides so that the two ends of the spring can be drawn out through the slits.

6. The linear vibrator of claim 5, wherein the two ends of the spring have holes, wherein the casing has protrusions in portions contacting the two ends of the spring drawn out, and wherein the spring and the casing are secured to each other by a welding with the protrusions of the casing fitted into the holes of the two ends of the spring.

7. The linear vibrator of claim 5, wherein the two ends of the spring are elastically deformed to pressurize contacting surfaces of the casing and secured to the casing by the welding.

8. The linear vibrator of claim 1, wherein both ends of the weight downwardly extend to cover side surfaces of the plate and magnets.

9. The linear vibrator of claim 1, wherein during vibration of the magnets, the plate and the weight an amplitude center is biased with respect to a geographical center of the linear vibrator.

* * * * *